US008004717B2

(12) United States Patent
Delfer et al.

(10) Patent No.: US 8,004,717 B2
(45) Date of Patent: Aug. 23, 2011

(54) STACK FLIPPING DOCUMENT HANDLING SYSTEM FOR UTILIZATION WITH PRINTING LAZY-PORTRAIT FORMATTED DOCUMENTS

(75) Inventors: Frank W. Delfer, Granite Bay, CA (US); Charles B. Clupper, El Dorado Hills, CA (US); Marc J. Fagan, Folsom, CA (US); Brett Jay Flickner, Folsom, CA (US); Matthew Thomas Leettola, El Dorado Hills, CA (US)

(73) Assignee: DST Output, El Dorado Hills, CA (US)

( * ) Notice: Subject to any disclaimer, the term of this patent is extended or adjusted under 35 U.S.C. 154(b) by 784 days.

(21) Appl. No.: 12/112,248

(22) Filed: Apr. 30, 2008

(65) Prior Publication Data

US 2009/0257095 A1  Oct. 15, 2009

Related U.S. Application Data

(63) Continuation-in-part of application No. 11/708,782, filed on Feb. 21, 2007, which is a continuation-in-part of application No. 11/492,594, filed on Jul. 25, 2006.

(60) Provisional application No. 60/927,209, filed on May 1, 2007.

(51) Int. Cl.
*H04N 1/405* (2006.01)
*B65H 5/22* (2006.01)

(52) U.S. Cl. ............ 358/3.04; 358/3.12; 271/3.14; 271/3.05; 271/3.06

(58) Field of Classification Search .............. 358/3.04, 358/3.12, 400, 471, 489, 496; 271/3.01, 271/3.05, 3.06, 3.14, 8.1
See application file for complete search history.

(56) References Cited

U.S. PATENT DOCUMENTS

| 4,307,958 | A | 12/1981 | McIrvine |
| 4,928,252 | A | 5/1990 | Gabbe et al. |
| 5,104,245 | A | 4/1992 | Oguri et al. |
| 5,825,996 | A | 10/1998 | Davis et al. |
| 5,887,126 | A | 3/1999 | Fujimoto |
| 5,995,721 | A | 11/1999 | Rourke et al. |
| 6,050,191 | A | 4/2000 | Enderle et al. |
| 6,092,761 | A | 7/2000 | Mushaben |
| 6,222,635 | B1 | 4/2001 | Gotoh |
| 6,313,822 | B1 | 11/2001 | McKay et al. |

(Continued)

FOREIGN PATENT DOCUMENTS

EP    1174327 A3    1/2002

(Continued)

*Primary Examiner* — Jerome Grant, II
(74) *Attorney, Agent, or Firm* — James M. Ritchey

(57) ABSTRACT

A printed sheet handling system and method for use with lazy-portrait narrow-end to narrow-end (LPEE) formatted pages web printed pages to produce document sets includes: a printer to print LPEE formatted paired document pages printed in 1 to N order and face up on a first half of the web and printed in N to 1 order and face down on a second half of the continuous web; a slitter that divides the LPEE formatted printed web into two streams of sheets, with one in 1 to N order and the other in N to 1 order; collecting both streams into separate stacks; flipping the N to 1 stack of sheets; and then withdrawing sheets from the tops of both stacks for cutting into pages, collating, and assembly into correctly aligned and page number-sequenced document sets.

29 Claims, 5 Drawing Sheets

U.S. PATENT DOCUMENTS

| | | |
|---|---|---|
| 6,337,745 B1 | 1/2002 | Aiello, Jr. et al. |
| 6,417,931 B2 | 7/2002 | Mori et al. |
| 6,507,411 B1 | 1/2003 | Nishikawa et al. |
| 6,509,977 B1 | 1/2003 | Kujirai et al. |
| 6,559,971 B1 | 5/2003 | Watts et al. |
| 6,705,702 B2 | 3/2004 | Gunther et al. |
| 6,813,038 B1 | 11/2004 | Kadowaki |
| 6,988,730 B2 * | 1/2006 | Fukatsu et al. ............... 271/306 |
| 6,994,005 B2 | 2/2006 | Lamothe |
| 7,014,182 B2 | 3/2006 | Marsh |
| 7,926,800 B2 * | 4/2011 | Oikawa et al. ............ 270/58.12 |
| 2007/0284799 A1 * | 12/2007 | Oikawa et al. ................ 270/37 |
| 2008/0217835 A1 * | 9/2008 | Delfer et al. ............ 270/58.14 |
| 2008/0219813 A1 * | 9/2008 | Delfer et al. ............ 414/222.01 |
| 2008/0285063 A1 * | 11/2008 | Delfer et al. ................ 358/1.12 |
| 2010/0231786 A1 * | 9/2010 | Tsubota et al. .............. 348/478 |

FOREIGN PATENT DOCUMENTS

| | | |
|---|---|---|
| EP | 1524169 A1 | 4/2005 |
| JP | 05-278930 | 10/1993 |
| JP | 06-040182 | 2/1994 |
| JP | 2003-011452 A | 1/2003 |
| JP | 2005-297952 A | 10/2005 |
| JP | 2005-313522 | 11/2005 |
| JP | 2005-320104 A | 11/2005 |
| JP | 2006-137521 | 6/2006 |
| JP | 2006-273158 A | 10/2006 |

* cited by examiner

STACK FLIPPING DOCUMENT HANDLING SYSTEM FOR UTILIZATION WITH PRINTING LAZY-PORTRAIT FORMATTED DOCUMENTS

CROSS-REFERENCE TO RELATED APPLICATIONS

This application is a continuation-in-part of copending U.S. application Ser. No. 11/708,782 filed on Feb. 21, 2007, which is a continuation-in-part of co-pending U.S. application Ser. No. 11/492,594 filed on Jul. 25, 2006. This application claims priority from U.S. provisional application Ser. No. 60/927,209 filed on May 1, 2007.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to an apparatus, system, and method for handling lazy-portrait printed documents (printing across a continuous paper web to produce paired portrait orientated pages or in "lazy-portrait narrow-end to narrow-end" formatting (LPEE)) so as to generate correctly oriented pages that are then processed and grouped into pre-designated document sets with continuously numbered pages. Particularly, to a system and method of processing LPEE formatted pages that permits a desired reorientation of a portion of the lazy-portrait printed documents to facilitate further processing into document sets that have correctly ordered page-sequences, wherein when LPEE head-to-head or bottom-to-bottom paired pages are printed, one half of the printed pairs are physically flipped after printing for generation of a correctly ordered sequential page count in each final assembled document set. More particularly, to a system and method of processing LPEE formatted pages comprising: printing LPEE head-to-head or bottom-to-bottom paired pages, wherein a first half of the printed pairs are printed in 1 to N order on a continuous paper web while the adjacent second half of the printed pairs are printed N to 1 order on the continuous paper web; separating the LPEE printed continuous paper web by a slitter into a first 1 to N printed stream of pages and a second N to 1 printed stream of pages; collecting the two streams of pages into two separate stacks; physically flipping the printed N to 1 order second half; and transferring pages from the top of the first 1 to N printed stack and the top of the now flipped N to 1 printed stack into cutting and collating equipment for generating a correctly sequenced page count for each final assembled document set.

2. Description of Related Art

The subject invention is utilized in connection with document pages that are printed in LPEE formatting. Thus, to fully understand the subject invention, it is deemed worthwhile to stress the difference between existing/traditional "two-up portrait" versus the current and novel subject LPEE ("lazy-portrait") printing styles and the documents produced by each type of printing scheme. Existing high-speed duplex variable data printing is carried out most frequently with continuous form printers using what is termed a "two-up portrait" format on a continuous web of paper. Two portrait printed sheets are printed side-by-side (both oriented in the same exact direction). This process, the standard in the industry, produces a continuous output of pages where, for example, the first four sheets (eight pages, front and back on four, eventually separate, sheets) appear as shown in FIG. 1—Prior Art. Currently, an advantage of printing in the prior art format is that it is compatible with more existing printers and more existing post-printing equipment for handling the printed sheets. A critical element of the prior art printing method is that to print either black or color markings on both pages, with the headings in color and the body in black, both the black and color-capable printing heads must span the entire width (long-side to long-side of a page) of both the duplexed sheets, $W^B$ and $W^C$, respectively (see FIG. 1). Examples of printers that function in this manner are the IBM InfoPrint 4000 and Oce VarioStream 7000. In a typical prior art printing system a continuous stream of traditionally printed sheets (such as the ones shown in FIG. 1) is printed and then moves into a slitter that separates the single steam into two streams of continuous sheets that then enter a cutter and collator for further processing to generate correctly page-sequenced document sets.

For the current subject invention, paper is printed in a lazy-portrait narrow-end to narrow-end (LPEE) format (as seen in FIGS. 2 and 3, for four pages and two pages, respectively), which is a means for more efficient and cost effective printing of variable and form data onto paper oriented in a lazy-portrait orientation. The term "lazy-portrait" (also known in the industry as "rotated landscape" when a printer merely uses a traditional printer head alignment spanning the entire page to print one rotated image) is defined as a portrait oriented page that is generated by printing the page from one wide edge to the other wide edge (side to side) and not from narrow edge or end to narrow edge or end (top to bottom or visa-versa), as is done in every other currently existing printing system.

The critical issue with the subject invention is that when a pair of head-to-head or bottom-to-bottom LPEE pages are printed on a continuous web/stream of paper, the single web/stream of paper with the paired images must then be separated/slitted into two separate streams of paper with one stream somehow being flipped over to correctly orient the final sheets/pages when cut, collated, and stacked into a pre-determined document set (as seen in FIG. 4 for a pair of LPEE printed sheets) with correct sequential page numbering. The current subject invention presents a system and method for accomplishing this sheet flipping process by flipping one entire stream of post-slitted sheets that were printed in N to 1 reverse order before cutting and collating the two stacks. In the subject system, a reverse order printing is utilized for one half of the paired LPEE printed sheets which, upon slitting into two streams of sheets, produces a first 1 to N ordered stack of sheets and a second reverse-order stack of sheets that is then physically flipped so that sheets removed from the flipped stack are now corrected oriented to align with the other normal-order and not flipped stack of sheets.

Again, it is noted that conventional paper handling systems exist that can transport and process paper printed in the existing and traditional two-up portrait style (not the subject paper LPEE orientation). For these traditional systems, the future document sets have pages that are already aligned head to head, and existing finishing, cutting, and inserting equipment readily handles the orientation of the two-up portrait printed paper.

Disclosed in U.S. Pat. No. 6,626,631 is a paper turner for work and turn printing operations. This is a patent on the device that flips a stack of documents, but does not disclose, teach, suggest, imply, or make obvious the subject method for a stack flipping device that is utilized in conjunction with printing and inserting of LPEE printed materials since for the subject LPEE paired sheets only one half of the original web is eventually flipped after it has been printed in reverse order relative to the other half of the LPEE paired sheets on the original web.

BRIEF SUMMARY OF THE INVENTION

An object of the present invention is to provide a paper handling system that orients lazy-portrait narrow-end to narrow-end format printed sheets into correctly page-sequenced document sets.

Another object of the present invention is to furnish a paper handling system that flips one of two paired lazy-portrait narrow-end to narrow-end format printed sheets to generate printed sheets that have correctly sequenced pages that are assembled into desired document sets.

A further object of the present invention is to supply a paper handling system that produced correctly page-sequenced document sets from a continuous web of lazy-portrait narrow-end to narrow-end (LPEE) format printed sheets by slitting a continuous stream of LPEE paired sheets, having one half of the paired sheets printed 1-N and the other half of the paired sheets printed N-1, into two streams, one stream for the 1-N sheets and one stream for the N-1 sheets, flipping the N-1 stream, cutting each stream into individual sheets, and collating the cut sheets into correctly page-sequenced document sets.

Still another object of the present invention is to disclose a method that orients lazy-portrait narrow-end to narrow-end format printed sheets into correctly page-sequenced document sets.

Yet a further object of the present invention is to describe a method that flips one of two paired lazy-portrait narrow-end to narrow-end format printed sheets to generate printed sheets that have correctly sequenced pages that are assembled into desired document sets.

Yet an additional object of the present invention is to supply a method for producing document sets with correct page-sequencing from a continuous web of lazy-portrait narrow-end to narrow-end (LPEE) format printed sheets by slitting a continuous stream of LPEE paired sheets, having one half of the paired sheets printed 1-N and the other half of the paired sheets printed N-1, into two streams, one stream for the 1-N sheets and one stream for the N-1 sheets, flipping the N-1 stream, cutting each stream into individual sheets, and collating the cut sheets into correctly page-sequenced document sets.

Disclosed is a system and method of use for processing LPEE formatted paired document pages printed on a continuous web of paper. Combined document sets are produced from the LPEE formatted paired document pages that are correctly aligned head-to-head and with correctly number-sequenced pages. Means are provided for printing LPEE formatting paired document pages the continuous web of paper in which the document pages are printed in 1 to N order and face up on a first half of the continuous web (first page in each LPEE pair) and printed in N to 1 order and face down on a second half of the continuous web (second page in each LPEE pair). The LPEE printed continuous web is then slit into a first stream of sheets with said 1 to N printed pages and a second stream of sheets with said N to 1 printed pages. Collection means are provided for stacking the first stream of sheets into a first stack of sheets and the second stream of sheets into a second stack of sheets. A suitable means for flipping the second stack of sheets (or the first if the 1 to N and N to 1 orders are reversed) is included. Additionally, means are described for withdrawing the first stream of sheets from the first stack's top and for withdrawing the second stream of sheets from the flipped second stack's top, thereby correctly aligning the first stream of sheets and the flipped second stream of sheets in a proper head-to-head orientation and in correctly number-sequenced pages for assembly of the desired document sets. After one stack is flipped, means are supplied for cutting the first and second streams of sheets into individual pages. Further, means are included for collating the individual pages, produced from the previous cutting set, into document sets that are correctly head-to-head aligned and correctly number-sequenced. Also, control and verification means are provided for operation of the system, tracking LPEE formatted pages within the system for 1 to N and N to 1 sequencing and which pages are within each document set, and establishing that correctly assembled document sets are produced by the system.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a depiction representing the PRIOR ART, wherein four total sheets are shown with paired/duplexed-document pages printed side-by-side, with all side-by-side pages oriented in traditional portrait-parallel fashion to one another.

FIG. 2 illustrates the subject invention's lazy-portrait documents wherein four total printed sheets are depicted in a duplexed lazy-portrait head-to-head page orientation and printed on the web in two printing lanes (simplexed printing jobs are only printed on one side of a sheet, thereby making assembly of a multi-page document more simplistic than with the duplexed embodiment which requires a sheet flipping process step that is the main focus of the subject invention).

DETAILED DESCRIPTION OF THE INVENTION

The subject system and method of operation comprises an application of a procedure for correctly assembly document sets from document pages that are printed with LPEE formatting (described above). As noted above, with the traditional printing methods any side-by-side paired printed sheets are oriented with the heads and bottoms aligned, unlike the subject invention in which paired LPEE printed sheets require a flipping process to properly align heads to heads and bottoms to bottoms in the final collated documents sets. Since in one preferred embodiment of the LPEE system/method, the paired printed paper is printed face up on one half of the web and face down on another half of the web the paper must again be re-oriented with the heads of the sheets in the same orientation and the face of the sheets on the same side prior to collation, usually collation for a mail inserter or equivalent device.

The subject invention comprises a system/method to accomplish the proper alignment of LPEE formatted paired sheets. The subject system/method includes printing one half of the paired LPEE sheets in forward order sequencing (first to last or 1 to N print in industry jargon) and printing the other half of the paired LPEE sheets in reverse order sequencing (last to first or N to 1 printing) at the same time. Subsequent to cutting and collating the document pages, the LPEE printed web is divided by a slitter and collected into two separate stacks of continuous sheets. one half of the stack needs to be inverted or flipped so that both half-stacks are then identically sequenced, either 1 to N or N to 1 order, depending on how the system controller directs the sheets presented at the cutter.

Figure 6:
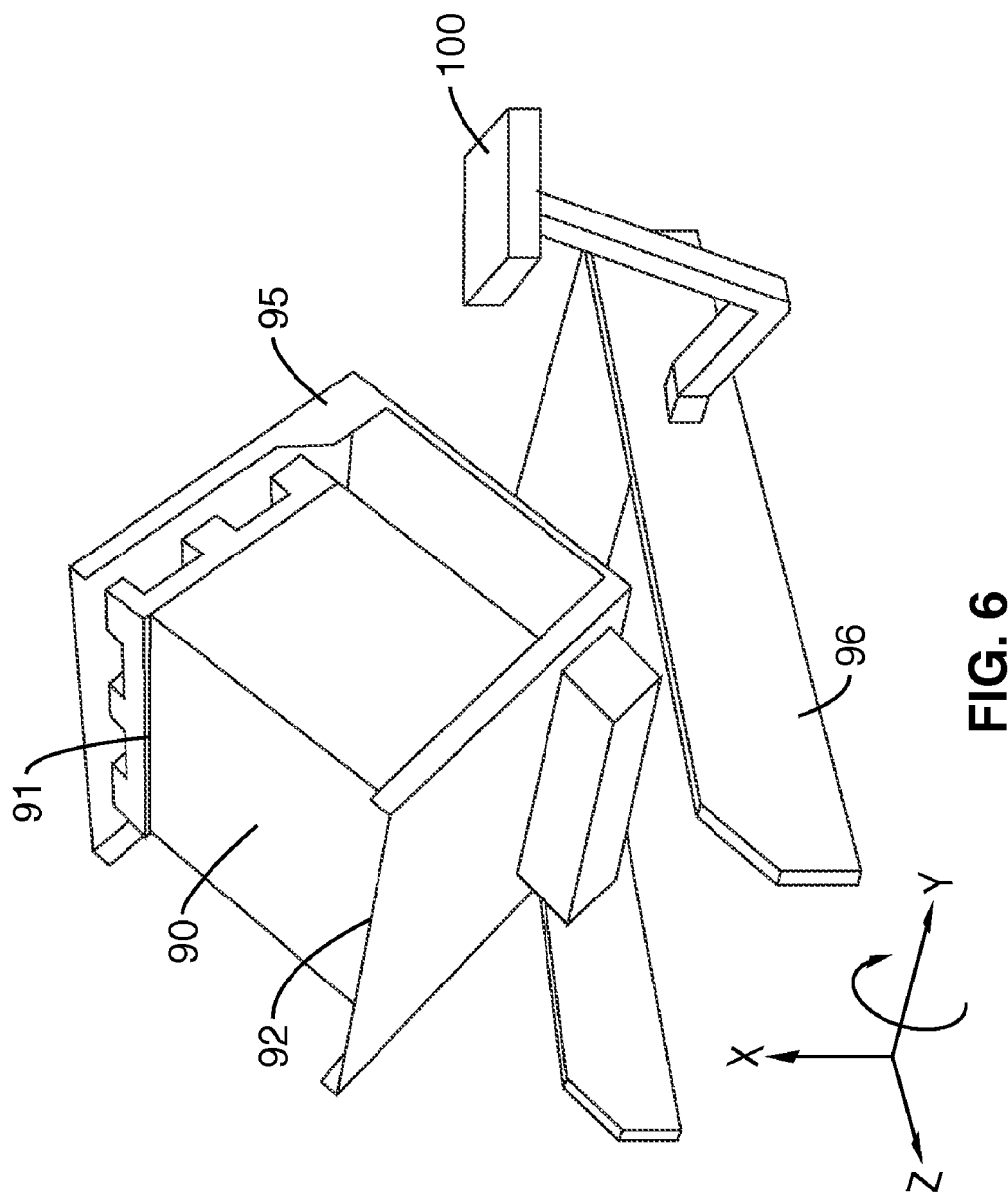
FIG. 6 is a perspective drawing of a typical stack flipping device (similar to a Heidelberg POLAR Pile Turner) that flips over an entire stack of collected sheets.

Equipment currently exists to flip a stack of document, but for completely different purposes than the subject invention. What is described and claimed for the subject invention is the novel and non-obvious system/method of flipping only one "HALF" of a divided LPEE formatted web of paired printed page material to reverse the order of the print and page orientation for the flipped stack for subsequent operations. This is a novel and non-obvious way to re-orient half the print that is printed using the subject LPEE formatted page method. Material handling devices exist that can flip over finished goods. The apparatus shown in FIG. 6 is similar to a Heidelberg POLAR PILE TURNER™ which inverts or flips a stack of continuous printed pages. Other equivalent devices are acceptable as long as the net result is that one of the two generated LPEE formatted stacks of continuous sheets is flipped over. The EZTURNER™ apparatus produces a flipped stack of pages by rocking the stack backwards through a complete 180° flip in place of rotating the stack through a complete 180° flip as is done with the POLAR PILE TURNER™.

Figure 2:
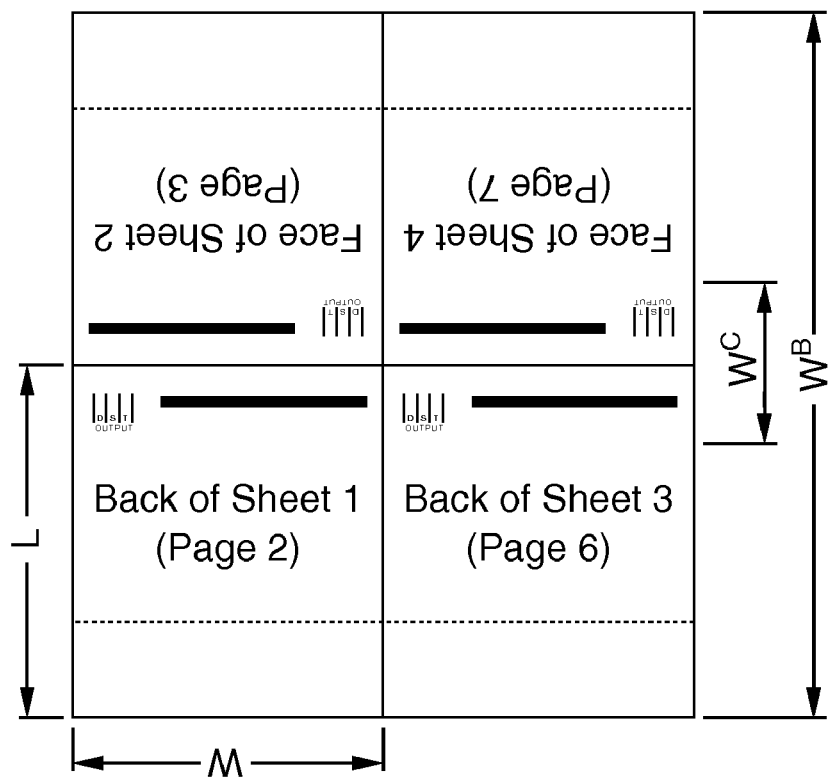
Figure 1:
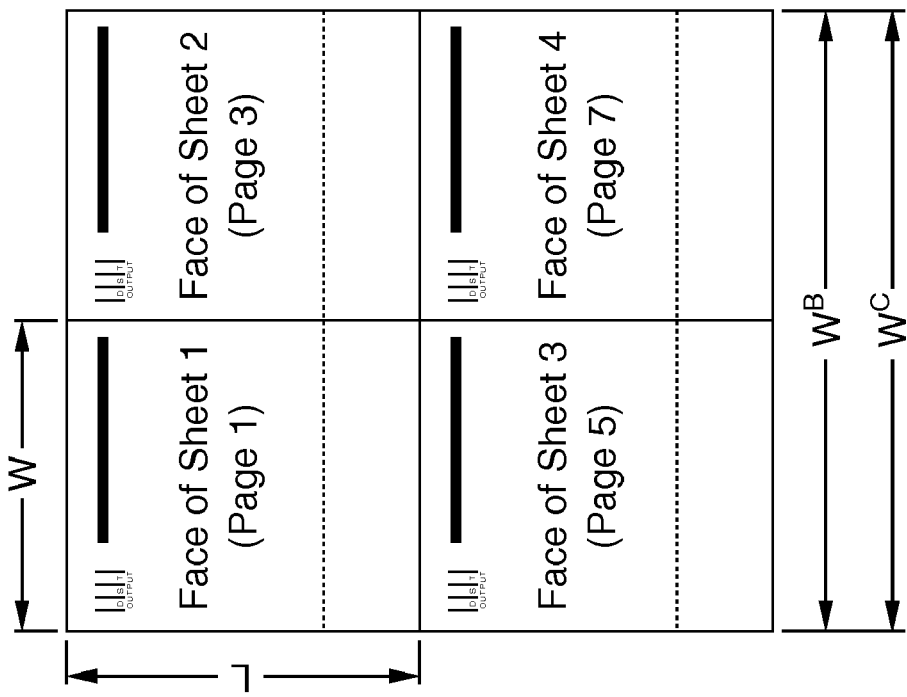
Figure 4:
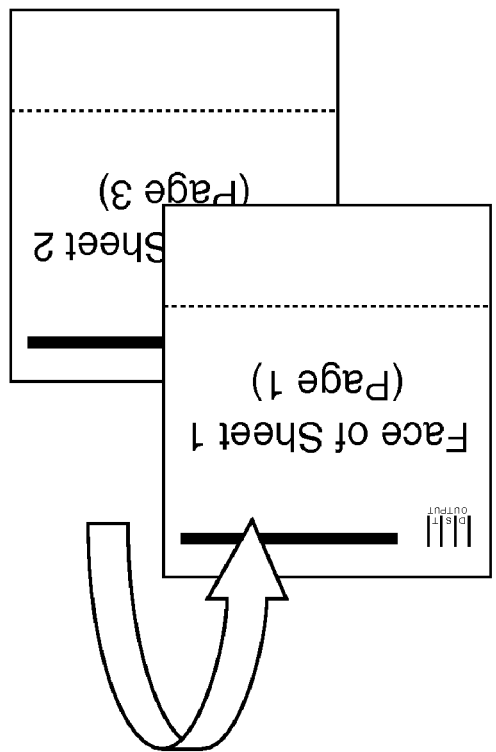
FIG. 4 shows the subject invention's ability to flip one of the paired sheets seen in FIG. 3 to produce correctly page-sequenced sheets (during normal operation, an entire stream of sheets is flipped and matched with its appropriate mate from the original pairing, as directed by a controller that tracks the exact position of each page during the document set processing procedure).
Figure 3:
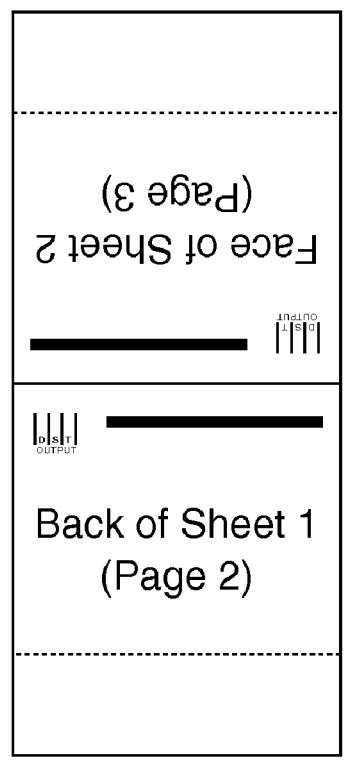
FIG. 3 shows the subject invention's formatting technique that produces lazy-portrait documents wherein a pair of printed sheets is depicted in a duplexed lazy-portrait head-to-head page orientation and printed on a continuous web in two printing lanes.
Figure 5:
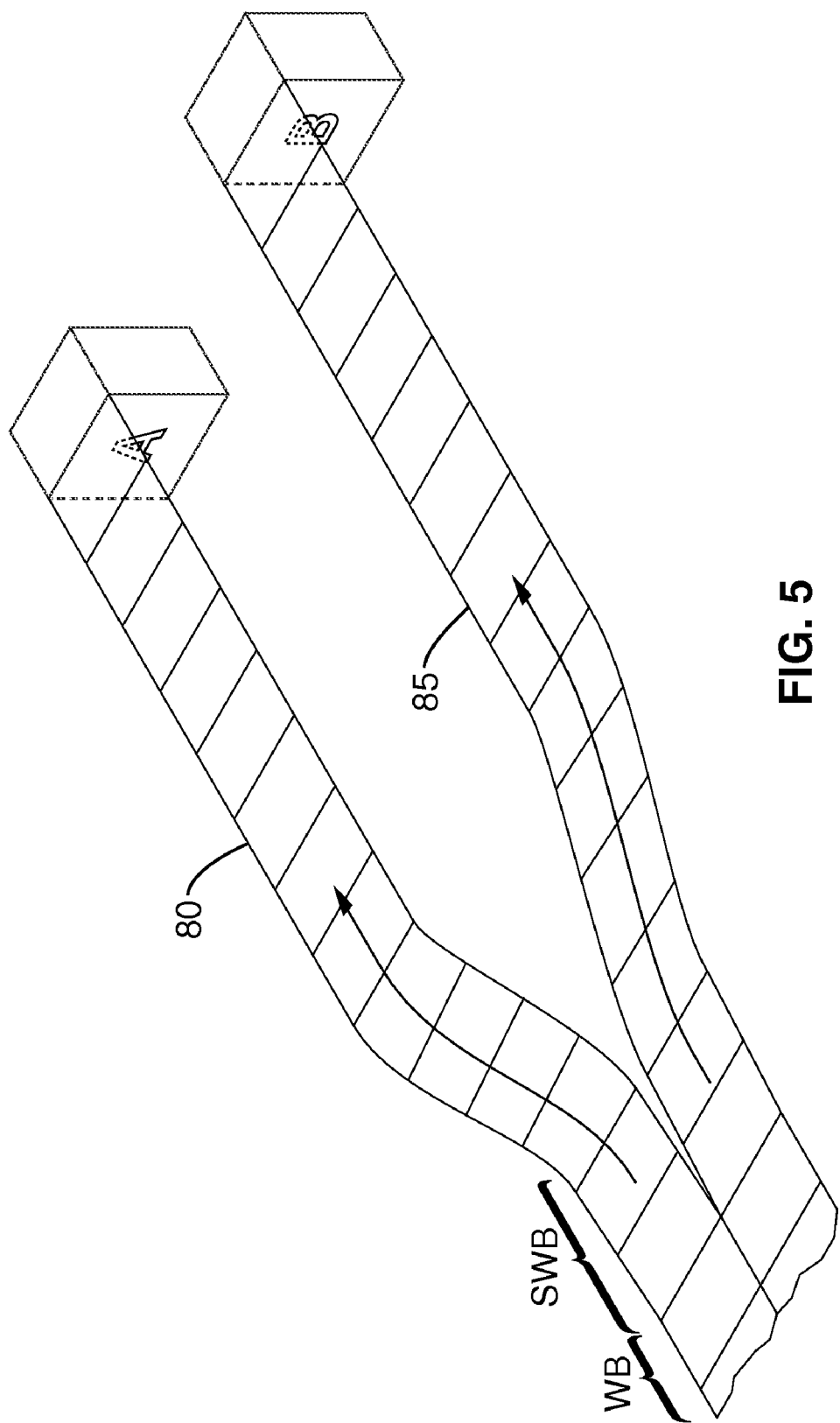
FIG. 5 shows that during the subject method, the LPEE formatted web is first divided into two streams by a slitter (one stream with document pages printed 1-N and the other stream with document pages printed N-1) and then each one of the streams is collected into a stack, stacks A and B.

More specifically, and referring to FIGS. 5-9, the subject invention comprises a system for correctly aligning LPEE formatted pages that are printed in pairs on a continuous web WB (as seen on the far left of FIG. 5). As seen in FIG. 5, the continuous web WB is then slit (this occurs via a traditional slitter apparatus) into two continuous streams of LPEE formatted pages SWB, one stream is then designated as stream 80 and the other as stream 85. The two streams 80 and 85 are then collected into two stacks A and B, respectively.

FIG. 6 illustrates a typical device that is employed to flip a stack of printed pages (as indicated above, a Heidelberg POLAR PILE TURNER™ or EZTURNER™ or equivalent device could be employed in this process). For the subject invention, only one of the two stacks needs to be flipped and in the depicted example stack B has been elected to be flipped (as long as the system controller tracks the order sequence and page locations within the two stacks A and B, either one could be flipped to generate correctly sequences final document sets). The flipping device clamps onto a stack of sheets 90 that will be rotated (see dashed arrow in FIG. 6 that depicts rotation) into an inverted orientation. In FIG. 6, the original bottom of the stack 91 has been rotated above the original top of the stack 92 by a stack-clamping means 95 that rotates within a supporting frame 96, as directed by a controller 100.

Figure 9:
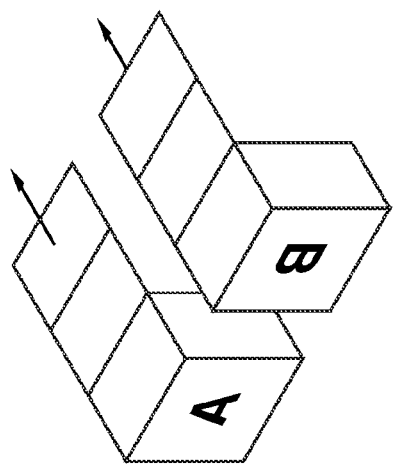
FIG. 9 shows that once one of the two stacks is flipped that the continuous pages are then removed for cutting and collating with both stacks now ordered in the same 1-N or N-1 sequence, depending upon which stack was flipped (stack B was flipped for this example), thereby producing correctly oriented sheets with sequential numbers for each document set.
Figure 8:
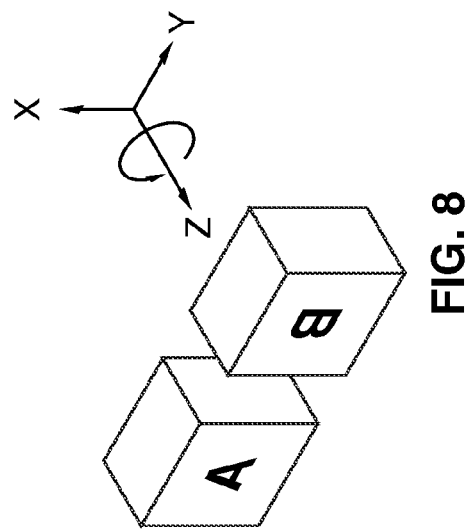
FIG. 8 shows that the subject system physically flips one of the two stacks (shown here, stack B is flipped along the "Z" axis by a device that functions like the stack flipping apparatus depicted in FIG. 6, but stack A could have been flipped to produce an equivalent result).
Figure 7:
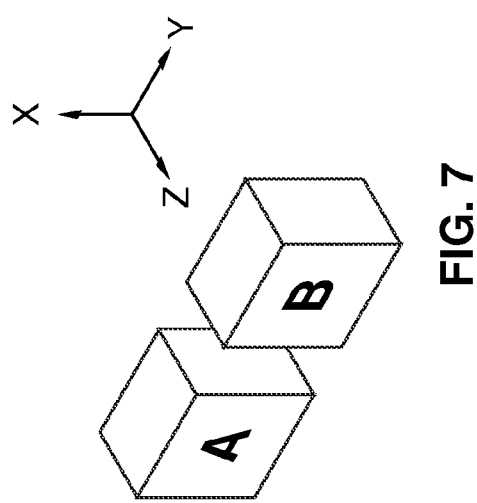
FIG. 7 shows the orientation of the two stacks of continuous sheets produced by slitting the original LPEE printed web into two streams of sheets, wherein one stack has pages running 1-N and the other stack has pages running N-1, for exemplary purposes only and not by way of limitation let stack A have pages running 1-N and stack B have pages running N-1.

FIGS. 7-9 illustrate the overall flipping process of one stack of LPEE formatted sheets B relative to the non-flipped stack of LPEE formatted sheets A. In FIG. 7 the two stacks A and B were created after slitting the original LPEE formatted web (as seen at the far right in FIG. 5). The 3-D X-Y-Z axes are shown are depicted in FIG. 7. FIG. 8 shows the flipping of stack B around the Z axis. This flipping re-orders the two stacks A and B relative to one another so that they are in 1 to N (or N to 1) sequenced order. As seen in FIG. 9, the stream of sheets from each stack A and B are then removed and sent to subsequent processing equipment (usually a cutter to produce individual pages and a collator to produce the desired document sets, with each document set having a correct page sequence and all page heads aligned properly).

A suitable control and verification means are associated with the subject system and method. Those means implement the subject invention by generating printed pages from input data, tracking printed pages through the slitter, subject flipping process, cutter, and collator, and verifying the process is functioning properly and that correctly page-sequenced document sets are created. Appropriately designed computer programs control the LPEE printing process, necessary paper transport and flipping processes (tracking the 1 to N and N to 1 sequencing in each stack A and B), the slitting device, the cutting equipment, the collation of correctly page-sequenced document sets, and any additional post collation processes. Once familiar with the subject invention, such programming abilities are within the skill of those programmers familiar with high-speed printing techniques, requirements, and equipment.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A printed sheet handling system for use with lazy-portrait narrow-end to narrow-end (LPEE) formatted paired document pages printed on a continuous web of paper, wherein combined document sets produced from the LPEE formatted paired document pages are correctly aligned head-to-head and with correctly number-sequenced pages, comprising:
   a. means for printing the LPEE formatted paired document pages on the web to produce one half of the paired pages in 1 to N order and the other half of the paired pages in N to 1 order;
   b. means for slitting said LPEE formatted paired document pages into a first stream of 1 to N ordered pages and a second stream of N to 1 ordered pages;
   c. means for stacking said streams into a first stack with 1 to N ordered pages and a second stack with N to 1 ordered pages;
   d. means for flipping said stacked second stream of N to 1 ordered pages;
   e. means for withdrawing said first stream from a top of said first stack and said second stream from a top of said flipped second stack;
   f. means for cutting said withdrawn streams into individual pages and collating said individual pages into document sets; and
   g. means for controlling the operation of the system and verifying correct assembly of document sets.

2. A printed sheet handling system for use with lazy-portrait narrow-end to narrow-end (LPEE) formatted paired document pages printed on a continuous web of paper, wherein combined document sets produced from the LPEE formatted paired document pages are correctly aligned head-to-head and with correctly number-sequenced pages, comprising:
   a. means for printing LPEE formatting paired document pages printed on a continuous web of paper in which the document pages are printed in 1 to N order and face up on a first half of the continuous web and printed in N to 1 order and face down on a second half of the continuous web;
   b. means for slitting said LPEE printed continuous web into a first stream of sheets with said 1 to N printed pages and a second stream of sheets with said N to 1 printed pages;
   c. means for collecting said first stream of sheets into a first stack of sheets and said second stream of sheets into a second stack of sheets;
   d. means for flipping said second stack of sheets; and
   e. means for withdrawing said first stream of sheets from said first stack's top and for withdrawing said second stream of sheets from said flipped second stack's top, thereby correctly aligning said first stream of sheets and said flipped second stream of sheets in a proper head-to-head orientation and in correctly number-sequenced pages for assembly of the desired document sets.

3. A printed sheet handling system for use with LPEE formatted paired document pages printed on a continuous web of paper according to claim 2, further comprising control and verification means for operation of the system, tracking LPEE formatted pages within the system for 1 to N and N to 1 sequencing and which pages are within each document set, and establishing that correctly assembled document sets are produced by the system.

4. A printed sheet handling system for use with LPEE formatted paired document pages printed on a continuous web of paper according to claim 2, wherein said slitting means comprises a slitter that separates the LPEE formatted printed paired document pages on the continuous web into said first stream of sheets from said second stream of sheets.

5. A printed sheet handling system for use with LPEE formatted paired document pages printed on a continuous web of paper according to claim 2, wherein said flipping means comprises a mechanical device that physically inverts said second stack of sheets.

6. A printed sheet handling system for use with LPEE formatted paired document pages printed on a continuous web of paper according to claim 2, further comprising means for cutting said first and second streams of sheets into individual pages.

7. A printed sheet handling system for use with LPEE formatted paired document pages printed on a continuous web of paper according to claim 6, further comprising means for collating said individual pages produced from said cutting means into document sets that are correctly head-to-head aligned and correctly number-sequenced.

8. A printed sheet handling system for use with lazy-portrait narrow-end to narrow-end (LPEE) formatted paired document pages printed on a continuous web of paper, wherein combined document sets produced from the LPEE formatted paired document pages are correctly aligned head-to-head and with correctly number-sequenced pages, comprising:
   a. means for printing LPEE formatting paired document pages printed on a continuous web of paper in which the document pages are printed in 1 to N order and face up on a first half of the continuous web and printed in N to 1 order and face down on a second half of the continuous web;
   b. means for slitting said LPEE printed continuous web into a first stream of sheets with said 1 to N printed pages and a second stream of sheets with said N to 1 printed pages;
   c. means for collecting said first stream of sheets into a first stack of sheets and said second stream of sheets into a second stack of sheets;
   d. means for flipping said second stack of sheets;

e. means for withdrawing said first stream of sheets from said first stack's top and for withdrawing said second stream of sheets from said flipped second stack's top, thereby correctly aligning said first stream of sheets and said flipped second stream of sheets in a proper head-to-head orientation and in correctly number-sequenced pages for assembly of the desired document sets;

f. means for controlling and verifying the operation of the system, tracking LPEE formatted pages within the system for 1 to N and N to 1 sequencing and which pages are within each document set, and establishing that correctly assembled document sets are produced by the system.

9. A printed sheet handling system for use with LPEE formatted paired document pages printed on a continuous web of paper according to claim 8, wherein said slitting means comprises a slitter that separates the LPEE formatted printed paired document pages on the continuous web into said first stream of sheets from said second stream of sheets.

10. A printed sheet handling system for use with LPEE formatted paired document pages printed on a continuous web of paper according to claim 8, wherein said flipping means comprises a mechanical device that physically inverts said second stack of sheets.

11. A printed sheet handling system for use with LPEE formatted paired document pages printed on a continuous web of paper according to claim 8, further comprising means for cutting said first and second streams of sheets into individual pages.

12. A printed sheet handling system for use with LPEE formatted paired document pages printed on a continuous web of paper according to claim 11, further comprising means for collating said individual pages produced from said cutting means into document sets that are correctly head-to-head aligned and correctly number-sequenced.

13. A printed sheet handling system for use with lazy-portrait narrow-end to narrow-end (LPEE) formatted paired document pages printed on a continuous web of paper, wherein combined document sets produced from the LPEE formatted paired document pages are correctly aligned head-to-head and with correctly number-sequenced pages, comprising:

a. means for printing LPEE formatting paired document pages printed on a continuous web of paper in which the document pages are printed in 1 to N order and face up on a first half of the continuous web and printed in N to 1 order and face down on a second half of the continuous web;

b. means for slitting said LPEE printed continuous web into a first stream of sheets with said 1 to N printed pages and a second stream of sheets with said N to 1 printed pages;

c. means for collecting said first stream of sheets into a first stack of sheets and said second stream of sheets into a second stack of sheets;

d. means for flipping said second stack of sheets;

e. means for withdrawing said first stream of sheets from said first stack's top and for withdrawing said second stream of sheets from said flipped second stack's top, thereby correctly aligning said first stream of sheets and said flipped second stream of sheets in a proper head-to-head orientation and in correctly number-sequenced pages for assembly of the desired document sets;

f. means for cutting said first and second streams of sheets into individual pages;

g. means for collating said individual pages produced from said cutting means into document sets that are correctly head-to-head aligned and correctly number-sequenced; and h. means for controlling and verifying the operation of the system, tracking LPEE formatted pages within the system for 1 to N and N to 1 sequencing and which pages are within each document set, and establishing that correctly assembled document sets are produced by the system.

14. A printed sheet handling system for use with LPEE formatted paired document pages printed on a continuous web of paper according to claim 13, wherein said slitting means comprises a slitter that separates the LPEE formatted printed paired document pages on the continuous web into said first stream of sheets from said second stream of sheets.

15. A printed sheet handling system for use with LPEE formatted paired document pages printed on a continuous web of paper according to claim 13, wherein said flipping means comprises a mechanical device that physically inverts said second stack of sheets.

16. A printed sheet handling method for use with lazy-portrait narrow-end to narrow-end (LPEE) formatted paired document pages printed on a continuous web of paper, wherein combined document sets produced from the LPEE formatted paired document pages are correctly aligned head-to-head and with correctly number-sequenced pages, comprising the steps:

a. printing LPEE formatting paired document pages printed on a continuous web of paper in which the document pages are printed in 1 to N order and face up on a first half of the continuous web and printed in N to 1 order and face down on a second half of the continuous web;

b. slitting said LPEE printed continuous web into a first stream of sheets with said 1 to N printed pages and a second stream of sheets with said N to 1 printed pages;

c. collecting said first stream of sheets into a first stack of sheets and said second stream of sheets into a second stack of sheets;

d. flipping said second stack of sheets; and e. withdrawing said first stream of sheets from said first stack's top and for withdrawing said second stream of sheets from said flipped second stack's top, thereby correctly aligning said first stream of sheets and said flipped second stream of sheets in a proper head-to-head orientation and in correctly number-sequenced pages for assembly of the desired document sets.

17. A printed sheet handling method for use with LPEE formatted paired document pages printed on a continuous web of paper according to claim 16, further comprising controlling and verifying operations for tracking LPEE formatted pages within the system for 1 to N and N to 1 sequencing and which pages are within each document set, and establishing that correctly assembled document sets are produced by the system.

18. A printed sheet handling method for use with LPEE formatted paired document pages printed on a continuous web of paper according to claim 16, wherein said slitting comprises utilizing a slitter that separates the LPEE formatted printed paired document pages on the continuous web into said first stream of sheets from said second stream of sheets.

19. A printed sheet handling method for use with LPEE formatted paired document pages printed on a continuous web of paper according to claim 16, wherein said flipping comprises utilizing a mechanical device that physically inverts said second stack of sheets.

20. A printed sheet handling method for use with LPEE formatted paired document pages printed on a continuous web of paper according to claim 16, further comprising cutting said first and second streams of sheets into individual pages.

21. A printed sheet handling method for use with LPEE formatted paired document pages printed on a continuous web of paper according to claim 20, further comprising collating said individual pages produced from said cutting into document sets that are correctly head-to-head aligned and correctly number-sequenced.

22. A printed sheet handling method for use with lazy-portrait narrow-end to narrow-end (LPEE) formatted paired document pages printed on a continuous web of paper, wherein combined document sets produced from the LPEE formatted paired document pages are correctly aligned head-to-head and with correctly number-sequenced pages, comprising:
   a. printing with LPEE formatting paired document pages printed on a continuous web of paper in which the document pages are printed in 1 to N order and face up on a first half of the continuous web and printed in N to 1 order and face down on a second half of the continuous web;
   b. slitting said LPEE printed continuous web into a first stream of sheets with said 1 to N printed pages and a second stream of sheets with said N to 1 printed pages;
   c. collecting said first stream of sheets into a first stack of sheets and said second stream of sheets into a second stack of sheets;
   d. flipping said second stack of sheets;
   e. withdrawing said first stream of sheets from said first stack's top and for withdrawing said second stream of sheets from said flipped second stack's top, thereby correctly aligning said first stream of sheets and said flipped second stream of sheets in a proper head-to-head orientation and in correctly number-sequenced pages for assembly of the desired document sets; and
   f. controlling and verifying operations for tracking LPEE formatted pages within the system for 1 to N and N to 1 sequencing and which pages are within each document set, and establishing that correctly assembled document sets are produced by the system.

23. A printed sheet handling method for use with LPEE formatted paired document pages printed on a continuous web of paper according to claim 22, wherein slitting comprises utilizing a slitter that separates the LPEE formatted printed paired document pages on the continuous web into said first stream of sheets from said second stream of sheets.

24. A printed sheet handling method for use with LPEE formatted paired document pages printed on a continuous web of paper according to claim 22, wherein said flipping comprises utilizing a mechanical device that physically inverts said second stack of sheets.

25. A printed sheet handling method for use with LPEE formatted paired document pages printed on a continuous web of paper according to claim 22, further comprising cutting said first and second streams of sheets into individual pages.

26. A printed sheet handling method for use with LPEE formatted paired document pages printed on a continuous web of paper according to claim 25, further comprising collating said individual pages produced from said cutting into document sets that are correctly head-to-head aligned and correctly number-sequenced.

27. A printed sheet handling method for use with lazy-portrait narrow-end to narrow-end (LPEE) formatted paired document pages printed on a continuous web of paper, wherein combined document sets produced from the LPEE formatted paired document pages are correctly aligned head-to-head and with correctly number-sequenced pages, comprising:
   a. printing with LPEE formatting paired document pages printed on a continuous web of paper in which the document pages are printed in 1 to N order and face up on a first half of the continuous web and printed in N to 1 order and face down on a second half of the continuous web;
   b. slitting said LPEE printed continuous web into a first stream of sheets with said 1 to N printed pages and a second stream of sheets with said N to 1 printed pages;
   c. collecting said first stream of sheets into a first stack of sheets and said second stream of sheets into a second stack of sheets;
   d. flipping said second stack of sheets;
   e. withdrawing said first stream of sheets from said first stack's top and for withdrawing said second stream of sheets from said flipped second stack's top, thereby correctly aligning said first stream of sheets and said flipped second stream of sheets in a proper head-to-head orientation and in correctly number-sequenced pages for assembly of the desired document sets;
   f. cutting said first and second streams of sheets into individual pages;
   g. collating said individual pages produced from said cutting means into document sets that are correctly head-to-head aligned and correctly number-sequenced; and
   h. controlling and verifying operations for tracking LPEE formatted pages within the system for 1 to N and N to 1 sequencing and which pages are within each document set, and establishing that correctly assembled document sets are produced by the system.

28. A printed sheet handling method for use with LPEE formatted paired document pages printed on a continuous web of paper according to claim 27, wherein said slitting comprises utilizing a slitter that separates the LPEE formatted printed paired document pages on the continuous web into said first stream of sheets from said second stream of sheets.

29. A printed sheet handling system for use with LPEE formatted paired document pages printed on a continuous web of paper according to claim 27, wherein said flipping comprises utilizing a mechanical device that physically inverts said second stack of sheets.

* * * * *